Oct. 7, 1958  R. L. DALTON  2,854,749
VIEWFINDER FOR PHOTOGRAPHIC CAMERAS
Filed Aug. 2, 1954  2 Sheets-Sheet 1

INVENTOR.
ROBERT L. DALTON
BY
ATTORNEY

Oct. 7, 1958   R. L. DALTON   2,854,749
VIEWFINDER FOR PHOTOGRAPHIC CAMERAS
Filed Aug. 2, 1954   2 Sheets-Sheet 2

INVENTOR.
ROBERT L. DALTON
BY
ATTORNEY

United States Patent Office 2,854,749
Patented Oct. 7, 1958

2,854,749

VIEWFINDER FOR PHOTOGRAPHIC CAMERAS

Robert L. Dalton, Irondequoit, N. Y., assignor to Graflex, Inc., Rochester, N. Y., a corporation of Delaware Application August 2, 1954, Serial No. 447,021

2 Claims. (Cl. 33—64)

The present invention relates to viewfinders for photographic cameras and more patricularly to a collapsible front viewfinder for a photographic camera of the folding type.

The conventional collapsible front sight or viewfinder comprises an inverted U-shaped wire, and a U-shaped channel member, into which the U-shaped wire is telescopingly slidable and which is mounted on the support for the lens board of the camera. This type of viewfinder is always in danger of being damaged in use. When it is extended, there is always the chance that it may be struck against the side of a wall or other hard object and bent. Oftentimes the photographer hastily pushes the lens board and bellows of the camera back into the camera case without first collapsing the front finder, and closes the camera case, catching the front finder in the camera case and bending it. Furthermore, with the conventional wire type front viewfinder, unless the photographer is careful in pulling up the finder wire to put it in operating position, it is apt to get cocked and jammed in the channel member, making it impossible to collapse the viewfinder again.

One object of the present invention is to provide a collapsible front viewfinder for photographic cameras which it is virtually impossible to damage, when extended, by striking it against any object.

Another object of the invention is to provide a collapsible front viewfinder which will not be damaged if through inadvertence, the photographer neglects to collapse the viewfinder before folding his camera.

A further object of the invention is to provide a front viewfinder for a camera which will not jam when being extended or collapsed.

Still another object of the invention is to provide a front viewfinder which is easier to assemble than the conventional viewfinder.

A still further object of the invention is to provide a front viewfinder which can be made at less expense than conventional front viewfinders.

Other objects of the invention will be apparent hereinafter from the specification and from the recital of the appended claims.

Figure 1:
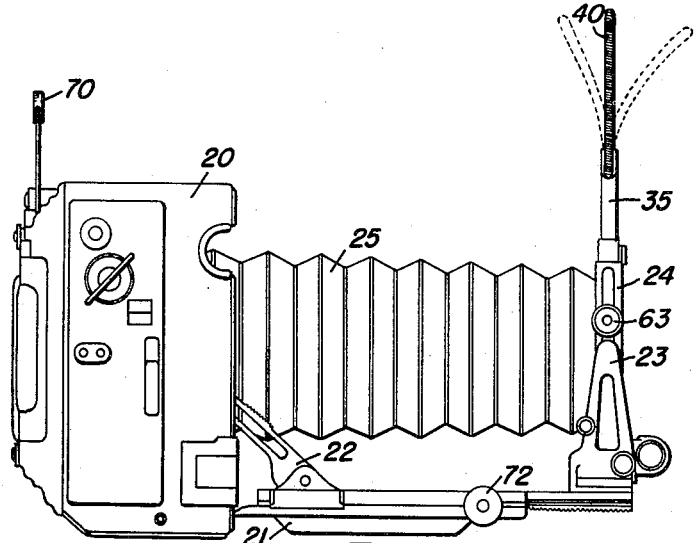
Fig. 1 is a right hand side elevation of a folding camera provided with a front viewfinder made according to one embodiment of this invention, the camera being shown open with the bellows extended and the viewfinder in operating, extended position.

Referring now to the drawings by numerals of reference, 20 denotes the box or case of a folding camera; and 21 designates the camera bed, on which are slidably mounted the supporting members 23 which carry the support 24 for the camera lens board. The lens board supporting member comprises two internested channeled members 30 and 31 which are of conventional construction as described, for instance, in the Steiner U. S. Patent No. 2,575,197, granted November 13, 1951.

Figure 6:
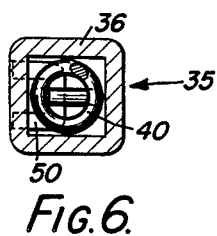
Fig. 6 is a section on the line 6—6 of Fig. 5 looking in the direction of the arrows.
Figure 3:
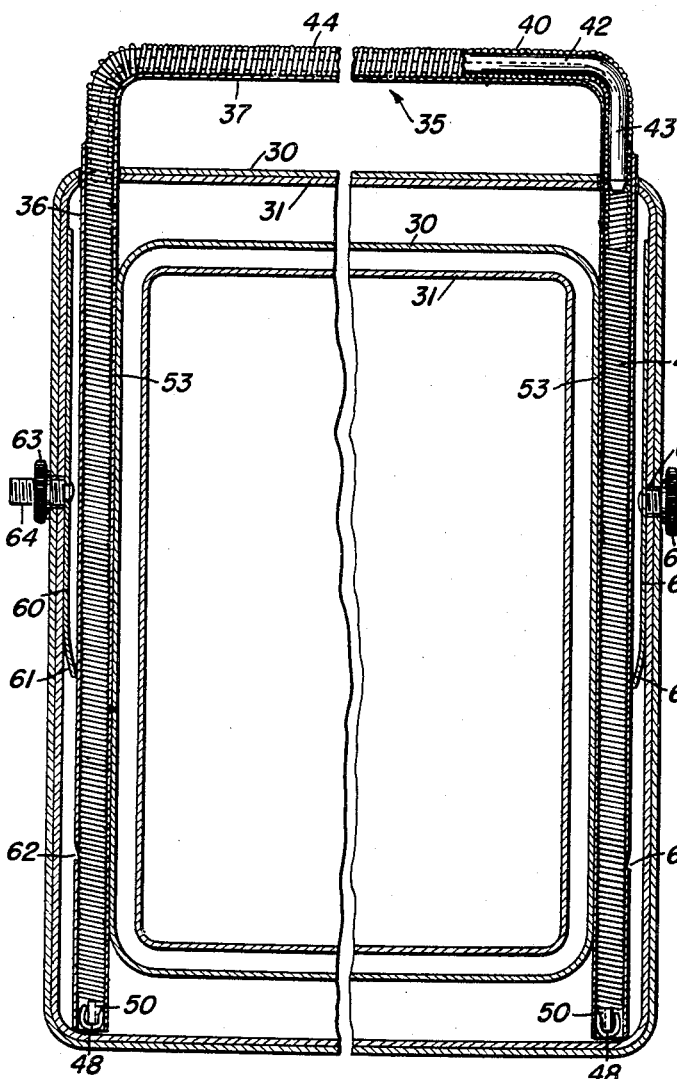
Fig. 3 is a vertical section on an enlarged scale through the viewfinder and its mounting, and showing the viewfinder in collapsed position.
Figure 4:
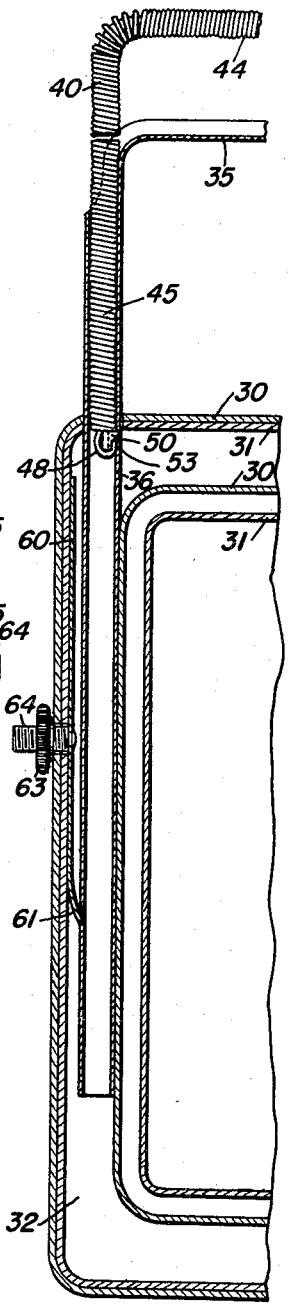
Fig. 4 is a fragmentary view, similar to Fig. 3, but showing the viewfinder in extended position.

Mounted to slide vertically in the space 32 (Fig. 4) between the members 30 and 31 is an inverted U-shaped frame 35. This frame has parallel legs 36 and a transverse connecting portion 37. The frame may be made of seamless square brass tubing which is rectangular in cross-section as shown in Fig. 6. The transverse connecting portion 37 and the upper portions of the legs 36 are cut away, as shown in Figs. 3 and 4, however, to provide a channel or recess for receiving the upper wire frame member of the viewfinder as will be described further hereinafter.

Slidably mounted in the frame 35 is the wire frame member 40. This upper frame member is made preferably of a single stainless steel wire coil which is close wound, either right or left hand. Inserted in this wire coil is a preferably stainless steel wire rod or core 42. The rod 42 is inserted in the coil while straight and while the coil itself is straight, and then the rod is bent to U-shape as shown in Fig. 3, thereby bending the coil to U-shape. The rod is of a length such that after bending its legs 43 extend for only a short distance below the transverse portion 44 of the coil.

Figure 5:
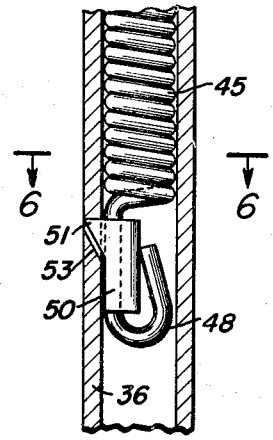
Fig. 5 is a fragmentary vertical section on a still further enlarged scale showing particularly the manner in which the dogs or stops, which are carried by the wire viewfinder engage the legs of the finder frame.
Figure 7:
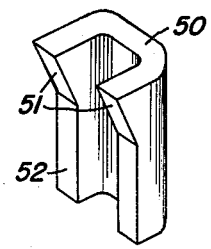
Fig. 7 is a perspective view of one of the dogs or stops which operate to lift the lower frame member when the upper frame member of the front viewfinder is raised to operating position.

The coil is formed at the lower ends of its leg portions 45 with hooks 48 (Fig. 5) on which are mounted stops or dogs 50 (Figs. 5, 6 and 7) which are made of strip brass or the like. These dogs or stops are bent to U-shape and formed to have protruding engaging portions 51 at the upper ends of their parallel leg portions 52. The projecting portions 51 are adapted to engage in slots 53 in the legs 36 of the frame 35 so that when the finder 40 is pulled upwardly, the frame will be pulled upwardly with it.

The frame itself is retained in the lens board support by clamp plates 60 (Figs. 3 and 4) which may be spring tempered phosphor bronze strips and which have inwardly bent portions 61 at their lower ends that are adapted to engage in notches 62 cut in the frame so as to limit the upward movement of the frame. The straps or clamp plates 60 are secured to the lens board support by nuts 63 which thread onto studs 64 that are riveted to the straps and that extend through aligned openings 65 in the lens board support.

The viewfinder of the invention is used in conventional manner. After the camera has been opened the viewfinder may be raised for focusing, and adjustment of the lens position may be made by rotation of the adjusting knob 72 (Fig. 1). When it is desired to fold the camera, the viewfinder 40 is first pushed down into frame 35, and then both are pushed down into the lens board support. The front sight shown is adapted to be opened fully to infinity position. Parallax compensation is achieved with the rear sight 70 which is adjustable, and which may be pivotally mounted on the camera casing to be swung to and from operating position.

Figure 2:
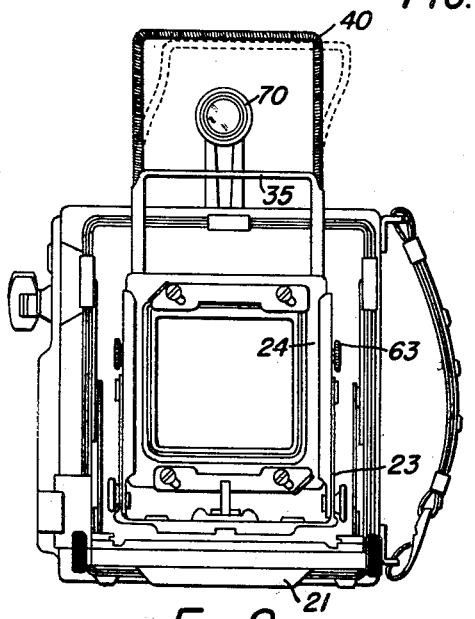
Fig. 2 is a front elevation of the camera shown in Fig. 1 again showing the front viewfinder and rear, peep sight in extended, operating positions.

The viewfinder described is flexible. It can readily flex forwardly or backwardly as shown in dotted lines in Fig. 1 without being damaged. It can also readily flex sidewise as shown in Fig. 2. If the viewfinder strikes a hard object, then, it will bend yieldably without being damaged. As soon as the pressure is released, it will spring back to its proper position. Moreover, if through inadvertence, the photographer pushes the lens board support 24 and bellows 25 to the rear, collapsing the camera, and then shuts the bed or door 21 without having first collapsed the viewfinder, no damage will be done; the viewfinder will simply bend out of the way. As soon as the camera is opened it will restore itself to its proper position. I have, therefore, provided a viewfinder which is practically undamageable.

While a particular embodiment of the invention has been described, it will be understood that the invention is capable of further modification and this application is intended to cover any variations, uses, or adaptations of the invention following, in general, the principles of the invention, and including such departures from the present disclosure as come within known or customary practice in the art to which the invention pertains, and may be applied to the essential features hereinbefore set forth and as fall within the scope of the invention or the limits of the appended claims.

Having thus described my invention, what I claim is:

1. In a photographic camera, a support, and a viewfinder mounted on said support, said viewfinder comprising an upper inverted U-shaped member, and a lower, inverted U-shaped member, the lower member having tubular leg portions, and the upper member having leg portions which telescope into said tubular leg portions, said upper member comprising a single, continuous close wound spring wire coil which is bent into inverted U-shape, and a rigid, inverted U-shaped core member, said core member having its transverse portion disposed within the transverse portion of the bent coil and having its legs disposed within the upper portions of the leg portions of said bent coil, the leg portions of said core being shorter than the leg portions of said bent coil, and the leg portions of said coil normally being parallel and normally extending in straight lines, but being bendable laterally, forwardly, and backwardly upon application of a deforming force thereto, but being returnable, due to the resilience of said coil, to their normal positions upon removal of said force.

2. In a photographic camera, a support, and a viewfinder mounted on said support, said viewfinder comprising a lower, inverted U-shaped frame member slidable vertically on said support, and an upper, inverted U-shaped frame member whose leg portions have vertically telescoping relation with the leg portions of said lower frame member, said upper frame member comprising a single, continuous, spring wire coil, said coil being bent into inverted U-shape, and a rigid inverted, U-shaped core disposed inside said coil centrally of the length of said coil to hold said coil in its inverted U-shape, the transverse portion of said core extending across the full width of the transverse portion of the bent coil, and the leg portions of said core extending downwardly into the leg portions of said bent coil but being shorter than the leg portions of said bent coil, each leg portion of the lower frame member having an opening therein, each leg portion of said coil terminating at its lower end in a hook, and a catch member carried by each hook to engage in one of said openings when brought into lateral registry therewith, whereby the lower frame member may be raised with the upper frame member, the leg portions of said coil being flexible laterally, forwardly, and backwardly, upon application of a force thereto, and returning to their normal positions, due to the resilience of said coil, upon removal of said force.

References Cited in the file of this patent

UNITED STATES PATENTS

| 2,590,164 | Fairbank | Mar. 25, 1952 |
| 2,662,456 | Steiner | Dec. 15, 1953 |

FOREIGN PATENTS

| 709,047 | France | May 11, 1931 |